(12) United States Patent
Oh

(10) Patent No.: US 11,619,946 B2
(45) Date of Patent: Apr. 4, 2023

(54) METHOD AND APPARATUS FOR GENERATING U-TURN PATH IN DEEP LEARNING-BASED AUTONOMOUS VEHICLE

(71) Applicants: Hyundai Motor Company, Seoul (KR); Kia Motors Corporation, Seoul (KR)

(72) Inventor: Tae Dong Oh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 264 days.

(21) Appl. No.: 16/995,973

(22) Filed: Aug. 18, 2020

(65) Prior Publication Data

US 2021/0294341 A1 Sep. 23, 2021

(30) Foreign Application Priority Data

Mar. 23, 2020 (KR) .................. 10-2020-0034905

(51) Int. Cl.
*G05D 1/02* (2020.01)
*G05D 1/00* (2006.01)
*G06N 3/04* (2023.01)
*G06N 3/08* (2023.01)

(52) U.S. Cl.
CPC ......... *G05D 1/0221* (2013.01); *G05D 1/0088* (2013.01); *G06N 3/04* (2013.01); *G06N 3/08* (2013.01); *G05D 2201/0213* (2013.01)

(58) Field of Classification Search
CPC ............... G05D 1/0221; G05D 1/0088; G05D 2201/0213; G05D 1/0212; G06N 3/04; G06N 3/08; G06N 3/084; B60W 60/0011; B60W 60/001; B60W 40/10; B60W 2050/0052; B60W 2552/50; B60W 2554/20; B60W 2554/40; G01C 21/3407; G01C 21/3446
See application file for complete search history.

(56) References Cited

U.S. PATENT DOCUMENTS

2018/0362035 A1* 12/2018 Schein ............ B60W 30/18145
2019/0005812 A1* 1/2019 Matus .................. G06V 20/584
2020/0348676 A1* 11/2020 Zhou ...................... G08G 1/166

OTHER PUBLICATIONS

L. Ma et al., "Efficient Sampling-Based Motion Planning for On-Road Autonomous Driving", IEEE, 16(4), pp. 1961-1976 (Aug. 20150.
S.M. LaValle, "Rapidly-Exploring Random Trees: A New Tool for Path Planning", pp. 1-4, (1998).

* cited by examiner

*Primary Examiner* — Marthe Y Marc-Coleman
(74) *Attorney, Agent, or Firm* — Fox Rothschild LLP

(57) ABSTRACT

A method for generating a U-turn path in an autonomous vehicle includes calculating a drivable area, generating multiple paths drivable in the drivable area, filtering a driving strategy path among the multiple paths based on deep learning, and determining a final path from the filtered candidate paths.

18 Claims, 16 Drawing Sheets

<EXAMPLE OF CALCULATING SCORE FOR EACH PATH CURVATURE>

<METHOD FOR CALCULATING PATH CURVATURE>

<EXAMPLE OF CALCULATING SCORE FOR EACH PATH LENGTH>

<METHOD FOR CALCULATING PATH LENGTH>

METHOD AND APPARATUS FOR GENERATING U-TURN PATH IN DEEP LEARNING-BASED AUTONOMOUS VEHICLE

CROSS-REFERENCE TO RELATED APPLICATION

This application claims under 35 U.S.C. § 119(a) the benefit of Korean Patent Application No. 10-2020-0034905, filed in the Korean Intellectual Property Office on Mar. 23, 2020, the entire contents of which are incorporated herein by reference.

BACKGROUND

(a) Technical Field

The present disclosure is directed to vehicle path guidance, and more particularly, relates to providing an optimal U-turn path for an autonomous vehicle based on deep learning.

(b) Description of the Related Art

In a path providing service through a connected car service (CCS) center of an existing vehicle, the center discovers an optimal path, a recommended path, a detour, or the like based on movement vehicle information, traffic light information, the number of lanes, a speed limit, and accident information of the road, for example, including accident information, road control information, and the like of the road, and provides a corresponding vehicle with information about the discovered information.

Because an existing vehicle utilizing the CCS center generates a previous U-turn path based on stored information (e.g., an expert through a previous road test or the like), the freedom to generate a driving path is limited and an unnatural U-turn path may result by locally determining only risk in a U-turn permitted area without analyzing a real-time surrounding situation in an overall manner.

An autonomous vehicle needs a capability of adaptively coping with a surrounding situation which changes in real time while driving.

It would be desirable to address a deep learning classification problem to filter multiple paths in a drivable area depending on a U-turn strategy, in order to consider complex situations and select an optimal path among multiple paths in which the U-turn strategy is reflected, with regard to elements such as risk, curvature, and length.

An optimal U-turn path, which is safer than making a U-turn based on real determination of a driver, may be generated by constructing adaptive U-turn strategies generated through deep learning as big data.

SUMMARY

An aspect of the present disclosure provides a method and apparatus for generating a U-turn path of an autonomous vehicle based on deep learning.

Another aspect of the present disclosure provides a method and apparatus for generating a U-turn path in a deep learning-based autonomous vehicle to classify and learn various sensing data for each feature, generate strategic multiple paths, and generate an optimal U-turn path with regard to various evaluation elements.

Another aspect of the present disclosure provides a method and apparatus for generating a U-turn path in a deep learning-based autonomous vehicle to configure a U-turn strategy actually performed for each driving situation as big data and perform deep learning based on the big data when the same situation occurs to provide a more reliable U-turn path.

Another aspect of the present disclosure provides a method and apparatus for generating a U-turn path in a deep learning-based autonomous vehicle to improve spatial freedom in generating a U-turn path.

Another aspect of the present disclosure provides a method and apparatus for generating a U-turn path in a deep learning-based autonomous vehicle to construct a training database through learning for each stage.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for generating a U-turn path in an autonomous vehicle may include calculating a drivable area, generating multiple paths drivable in the drivable area, filtering a driving strategy path among the multiple paths based on deep learning, and determining a final path from the filtered candidate paths.

In an embodiment, the drivable area may be calculated based on at least one of information about an object around a host vehicle, information about a road around the host vehicle, or information about a structure around the host vehicle.

In an embodiment, the filtering of the driving strategy path may be performed by classifying input information collected from a plurality of peripheral devices in a deep learning classification technique, selecting a most suitable U-turn strategy through neural network learning based on the classified input information, and excluding a path, which is not matched to the selected U-turn strategy, from the candidate paths.

In an embodiment, the selecting of the most suitable U-turn strategy through the neural network learning based on the classified input information may include obtaining a plurality of previously generated U-turn strategy lists, calculating a similarity probability for each U-turn strategy included in the U-turn strategy list through the neural network learning for the multiple paths, and selecting a most suitable U-turn strategy based on the similarity probability calculated for each U-turn strategy.

In an embodiment, the multiple paths, which are not mapped to the U-turn strategy included in the U-turn strategy list, may be filtered.

In an embodiment, a neural network may have a deep learning structure of at least one of convolution neural networks (CNN), a recurrent neural network (RNN), deep neural networks (DNN), a restricted Boltzmann machine (RBM), deep belief networks (DBN), a long short-term memory (LSTM), a gamma neural network (GAN), or a softmax model.

In an embodiment, the determining of the final path may include calculating an evaluation score for each candidate path for at least one of risk, curvature, or distance, and determining the final path based on the evaluation score calculated for each candidate path. The final path determined according to a situation where a host vehicle is traveling may be recorded in a database and may be used in the deep learning.

In an embodiment, the object may include a static object and a dynamic object. The static object may be used to calculate the drivable area and the dynamic object may be used to analyze a risk of an outside vehicle approaching from a lane opposite to a lane on which the host is traveling.

In an embodiment, the calculating of the drivable area may include calculating a first drivable area based on the road information, calculating a second drivable area based on the static object, and determining an area, where the first drivable area and the second drivable area are overlapped, as a final drivable area.

In an embodiment, the method may further include constructing a training model for the deep learning. The training model may be constructed by constructing an initial learning model through simulation-based deep learning, constructing big data through cloud server-based deep learning, and constructing a local database through personalized deep learning.

According to another aspect of the present disclosure, an apparatus for generating a U-turn path in an autonomous vehicle may include a fusion device that generates fusion information, an area calculating device that calculates a drivable area based on the fusion information, a path generator that generates multiple paths drivable in the drivable area, a learning device that filters a driving strategy path among the multiple paths based on deep learning, and a controller configured to determine a final path from the filtered candidate paths.

In an embodiment, the fusion device may include an object fusion module that generates object information around a host vehicle, a road information fusion module that generates road information around the host vehicle, and a location information fusion module that generates global coordinate information necessary to generate the road information.

In an embodiment, the learning device may classify input information collected from a plurality of peripheral devices in a deep learning classification technique, may select a most suitable U-turn strategy through neural network learning based on the classified input information, and may exclude a path, which is not matched to the selected U-turn strategy, from the candidate paths.

In an embodiment, the apparatus may further include a strategy generator that generates a plurality of U-turn strategy lists. The learning device may obtain the plurality of previously generated U-turn strategy lists from the strategy generator, may calculate a similarity probability for each U-turn strategy included in the U-turn strategy list through the neural network learning for the multiple paths, and may select a most suitable U-turn strategy based on the similarity probability calculated for each U-turn strategy.

In an embodiment, the multiple paths, which are not mapped to the U-turn strategy included in the U-turn strategy list, may be filtered.

In an embodiment, a neural network may have a deep learning structure of at least one of convolution neural networks (CNN), a recurrent neural network (RNN), deep neural networks (DNN), a restricted Boltzmann machine (RBM), deep belief networks (DBN), a long short-term memory (LSTM), a gamma neural network (GAN), or a softmax model.

In an embodiment, the controller may calculate an evaluation score for each candidate path for at least one of risk, curvature, or distance and may determine the final path based on the evaluation score calculated for each candidate path. The final path determined according to a situation where a host vehicle is traveling may be recorded in a database and may be used in the deep learning.

In an embodiment, the object information may include static object information and dynamic object information. The static object information may be used to calculate the drivable area and the dynamic object information may be used to analyze a risk of an outside vehicle approaching from a lane opposite to a lane on which the host is traveling.

In an embodiment, the area calculating device may calculate a first drivable area based on the road information, may calculate a second drivable area based on the static object, and may determine an area, where the first drivable area and the second drivable area are overlapped, as a final drivable area.

In an embodiment, a training model may be used for the deep learning. The training model may be generated by an algorithm for constructing an initial learning model through simulation-based deep learning, an algorithm for constructing big data through cloud server-based deep learning, and/or an algorithm for constructing a local database through personalized deep learning.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
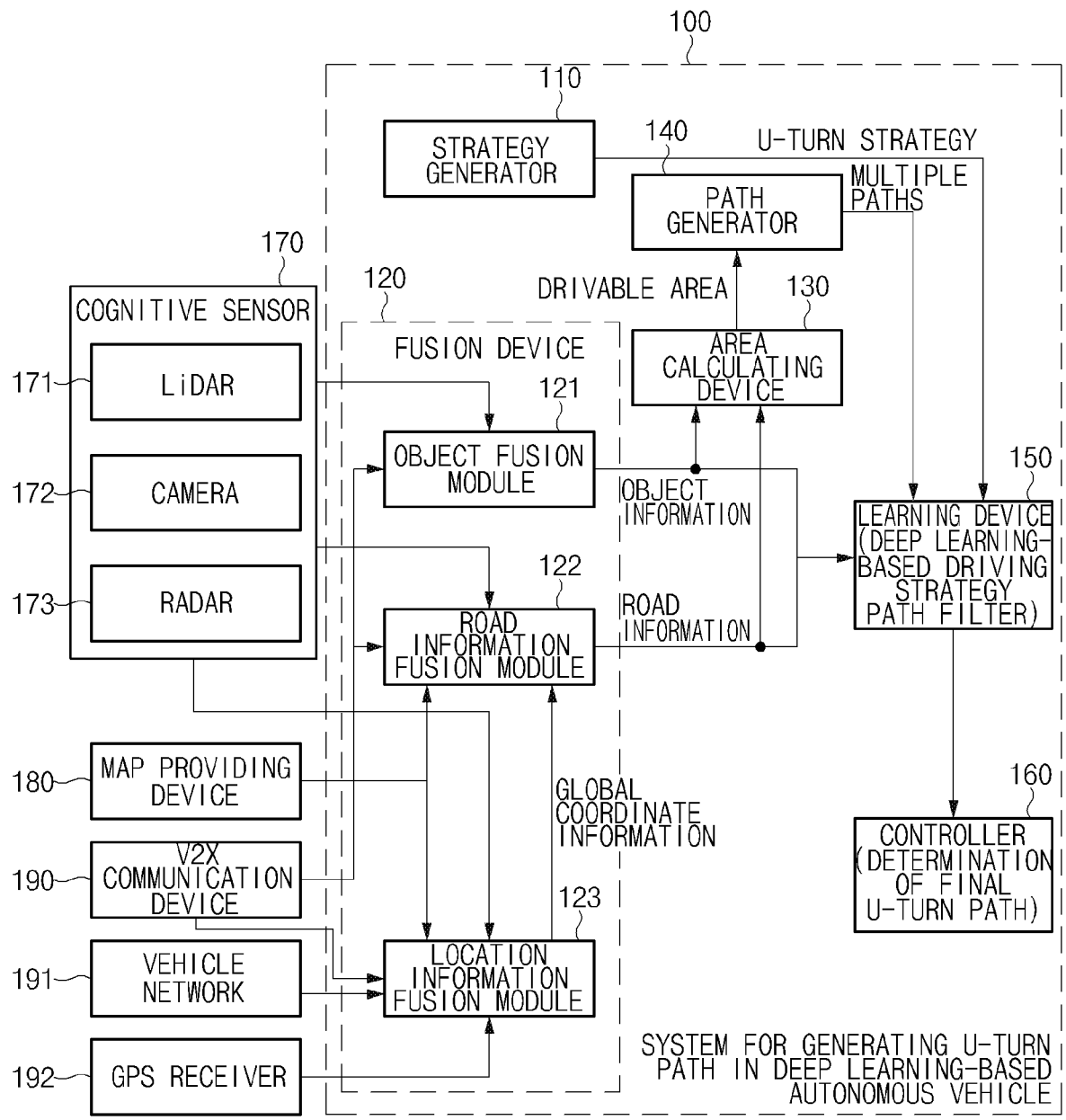
FIG. 1 is a block diagram illustrating a structure of a system for generating a U-turn path in a deep learning-based autonomous vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 16.

FIG. 1 is a block diagram illustrating a structure of a system for generating a U-turn path in a deep learning-based autonomous vehicle according to an embodiment of the present disclosure.

Hereinafter, for convenience of description, a system 100 for generating a U-turn path in a deep learning-based autonomous vehicle is simply referred to as the system 100.

Referring to FIG. 1, the system 100 may be configured to include a strategy generator 110, a fusion device 120, an area calculating device 130, a path generator 140, a learning device 150, and a controller 160. The respective components may be combined into one component, and some components may be omitted.

The strategy generator 110 may generate at least one U-turn strategy.

The fusion device 120 may be configured to include an object fusion module 121, a road information fusion module 122, and a location information fusion module 123.

The object fusion module 121 may identify a static object and a dynamic object around a host vehicle based on a variety of sensing information obtained from a cognitive sensor 170 and various vehicle-to-everything (V2X) communication data received from a V2X communication device 190 and may output detailed information about the identified object.

Herein, the detailed information about the object may include, but is not limited to, object type information for classifying whether the object is a static object or a dynamic object, location information, vehicle speed information, acceleration speed, a yaw rate, steering wheel angle information, or the like.

In an embodiment, the cognitive sensor 170 may include, but is not limited to, a light detection and ranging (LiDAR) 171, a camera 172, and a radar 173.

The road information fusion device 122 may obtain information about a static object around the host vehicle, may obtain detailed map information around the host vehicle from a map providing device 180, may obtain infra information for a vehicle-to-infrastructure (V2I) communication around the host vehicle from the V2X communication device 190, may obtain information about a location of the host vehicle, that is, global coordinates of the host vehicle from the location information fusion module 123, and may generate and output road information based on the obtained information. As an example, the road information may include, but is not limited to, road type information of the road where the host vehicle is currently traveling, for example, including a highway, a limited-access road, a main road, a back road, a one-way road, or the like, lane information of the road where the host vehicle is traveling, for example, one-way third lane in the direction of Jamsil, two-way fourth lane in the direction of Yeouido, or the like, and information about a line where the host vehicle is currently traveling, and the like.

The location information fusion module 123 may obtain information about a static object around the host vehicle from the cognitive sensor 170, may obtain driving speed and wheel speed information of the host vehicle over the vehicle network 191, may obtain detailed map information from the map providing device 180, may obtain road information around the host vehicle from the V2X communication device 190, may obtain GPS information from the GPS receiver 192, and output current location information of the host vehicle, that is, global coordinate information of the host vehicle.

The area calculating device 130 may receive object information and road information around the host vehicle and may calculate and output a drivable area of the host vehicle.

The path generator 140 may calculate and output multiple paths for the drivable area.

In an embodiment, the path generator 140 may obtain information about a U-turn strategy from the strategy generator 110. In this case, the path generator 140 may calculate and output multiple paths for each U-turn strategy in a drivable area.

The learning device 150 may receive U-turn strategy information from the strategy generator 110, may receive multi-path information from the path generator 140, and may receive object information and road information from the fusion device 120.

The learning device 150 may match a road situation of the road where the host is currently traveling and an environment around the host vehicle to at least one U-turn strategy meaningfully generated by the strategy generator 110 among several U-turn strategies. The learning device 150 may exclude a path, which is not matched to a U-turn strategy, that is, has low similarity from objects to be considered.

The controller 160 may calculate an evaluation score for each path by applying certain evaluation criteria, for example, risk, curvature, and length, to multiple paths filtered by the learning device 150, that is, multiple paths in which the U-turn strategy is reflected, and may determine an optimal U-turn path based on the calculated evaluation score.

Figure 2:
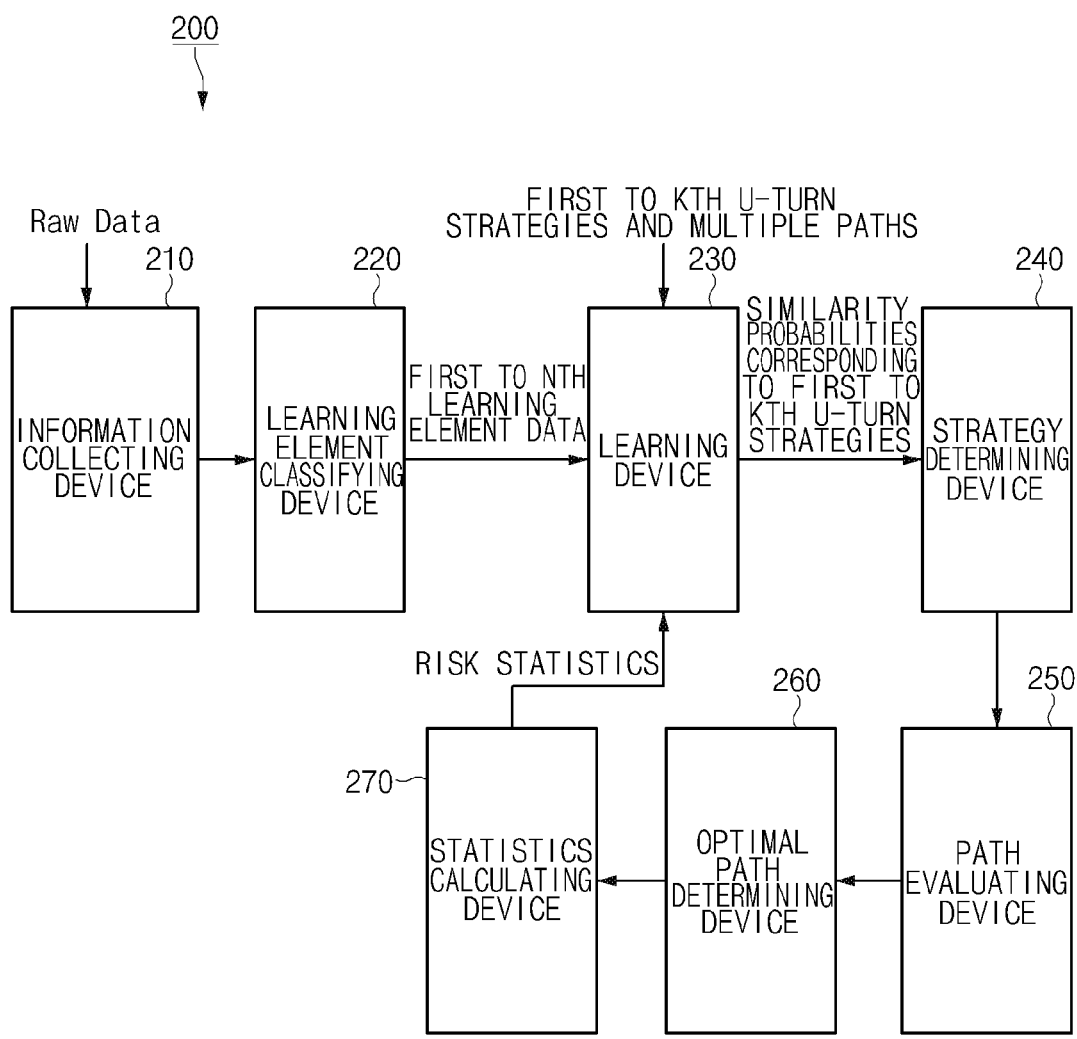
FIG. 2 is a block diagram illustrating a structure of an apparatus for generating a U-turn path in a deep learning-based autonomous vehicle according to an embodiment of the present disclosure.

FIG. 2 is a block diagram illustrating a structure of an apparatus for generating a U-turn path in a deep learning-based autonomous vehicle according to an embodiment of the present disclosure.

Hereinafter, for convenience of description, an apparatus 200 for generating a U-turn path in a deep learning-based autonomous vehicle is simply referred to as the apparatus 200.

Referring to FIG. 2, the apparatus 200 may be configured to include an information collecting device 210, a learning element classifying device 220, a learning device 230, a strategy determining device 240, a path evaluating device 250, an optimal path determining device 260, and a statistics calculating device 270.

The information collecting device 210 may collect various raw data 210 from various peripheral devices provided in an autonomous vehicle.

Herein, as described with reference to FIG. 1, the raw data may include, but is not limited to, information collected from a cognitive sensor 170 of FIG. 1, information collected from a map providing device 180 of FIG. 1, information collected from a V2X communication device 190 of FIG. 1, information collected from a vehicle network 191 of FIG. 1, information collected from a GPS receiver 192 of FIG. 1, or the like.

The learning element classifying device 220 may classify the raw data collected by the information collecting device 210 for each predefined learning element.

As an example, the learning element may include a learning element for determining an intention of a preceding vehicle, a learning element for determining a risk of a dynamic object on an opposite lane, a learning element associated with a pedestrian, a learning element associated with a static object, a learning element associated with a final drivable area, or the like.

The learning device 230 may receive first to Nth learning element data, first to Kth U-turn strategies, and multiple paths to perform deep learning.

The learning device 230 may output similarity probabilities corresponding to the first to Kth U-turn strategies through the deep learning.

The learning device 230 may filter a U-turn path, which is not mapped to the first to Kth U-turn strategies, among the input multiple paths to be removed from multiple paths to be considered.

The strategy determining device 240 may determine an optimal U-turn strategy based on a similarity probability for each strategy.

The path evaluating device 250 may calculate an evaluation score according to a certain evaluation criterion with respect to each of path(s) corresponding to the determined optimal U-turn strategy.

The optimal path determining device 260 may determine a path with the highest evaluation score as a final U-turn path.

The statistics calculating device 270 may calculate driving safety statistics for the U-turn strategy and the U-turn path, which are finally determined, and may provide the learning device 230 with the driving safety statistics.

The learning device 230 may provide the autonomous vehicle with a safer U-turn path by performing deep learning by further using feedback information, that is, driving safety statistics information about a U-turn path applied to the autonomous vehicle.

Figure 3:
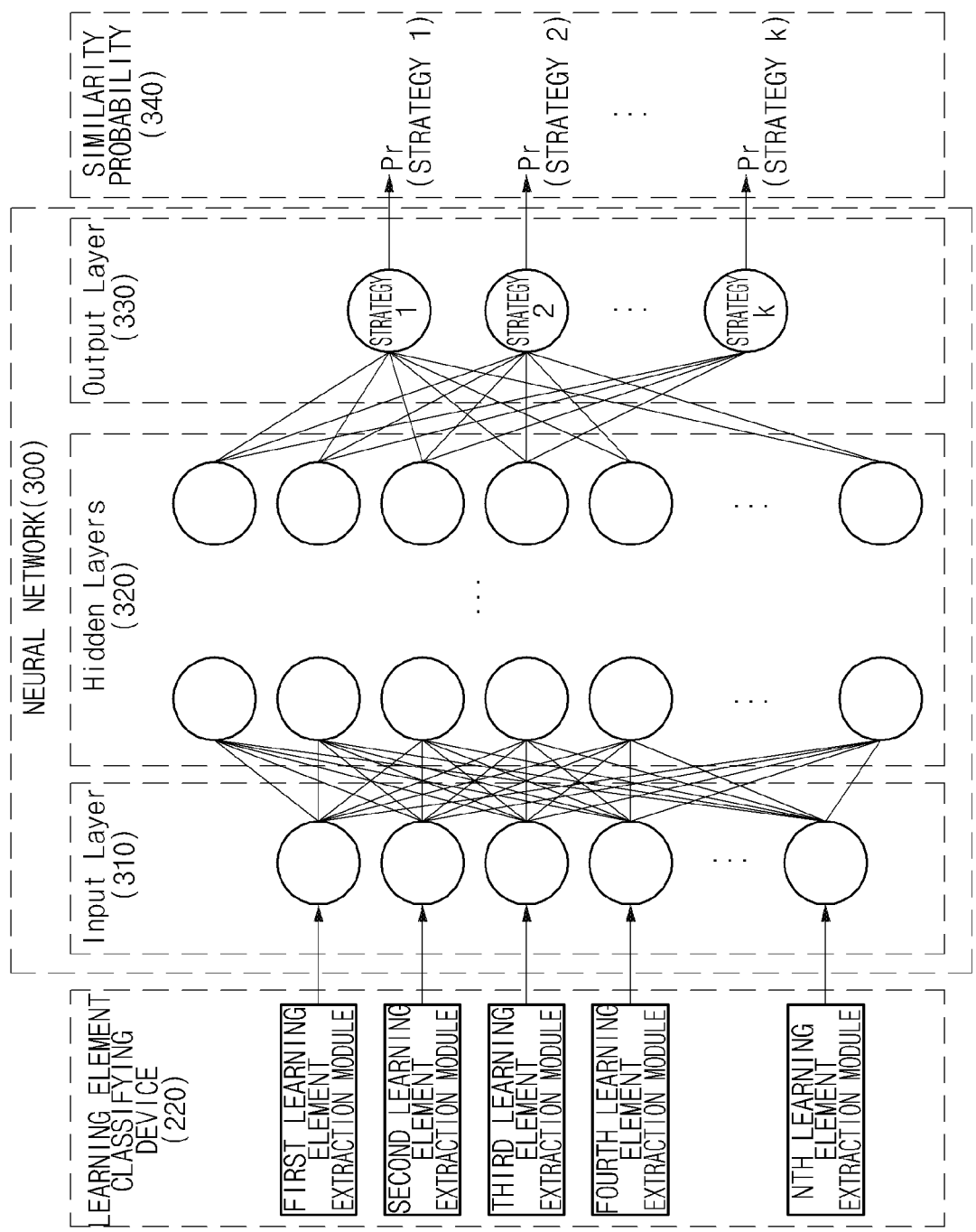
FIG. 3 is a drawing illustrating a neural network structure applied to a learning device according to an embodiment of the present disclosure.

FIG. 3 is a drawing illustrating a neural network structure applied to a learning device according to an embodiment of the present disclosure.

A neural network configuration according to an embodiment of the present disclosure may be implemented to have a deep learning structure of at least one of convolution neural networks (CNN), a recurrent neural network (RNN), deep neural networks (DNN), a restricted Boltzmann machine (RBM), deep belief networks (DBN), a long short-term memory (LSTM), a gamma neural network (GAN), or a softmax model.

The neural network according to an embodiment of the present disclosure is not limited to only the examples, and may include any type of deep neural network structure capable of learning outputs of learning element extraction modules given for purposes and meeting performance for a time when the U-turn is initiated.

Referring to FIG. 3, a neural network 300 may be configured to roughly include an input layer 310, hidden layers 320, and an output layer 330.

A configuration of the neural network 300 according to an embodiment may have a neural network structure capable of determining a time when it is possible to make a U-turn by having at least 10 or more hidden layers 320 and at least 500 or more nodes when considering the number of input nodes and complexity of the system. However, the number of the hidden layers 320 and the number of all the nodes are not limited to that described above.

It is indicated that one node of the input layer 310 is matched one-to-one with one learning element extraction module of a learning element classifying device 220 in FIG. 3, but this is only one embodiment. In another embodiment, an output of each learning element output module may be input to a plurality of nodes of the input layer 310. Furthermore, one node of the input layer 310 may receive information from a plurality of learning element output modules.

An output from the output layer 330 may be similarity corresponding to each of N numbers of U-turn strategies, which are previously classified, that is, a probability that multiple paths will be selected as a corresponding U-turn strategy. A final U-turn strategy may be selected based on a similarity probability 340 corresponding to each strategy upon autonomous driving. In this case, feedback information about how many times the risk determination occurs while driving along the finally selected U-turn path may be used for error back-propagation of the neural network 300.

Figure 4:
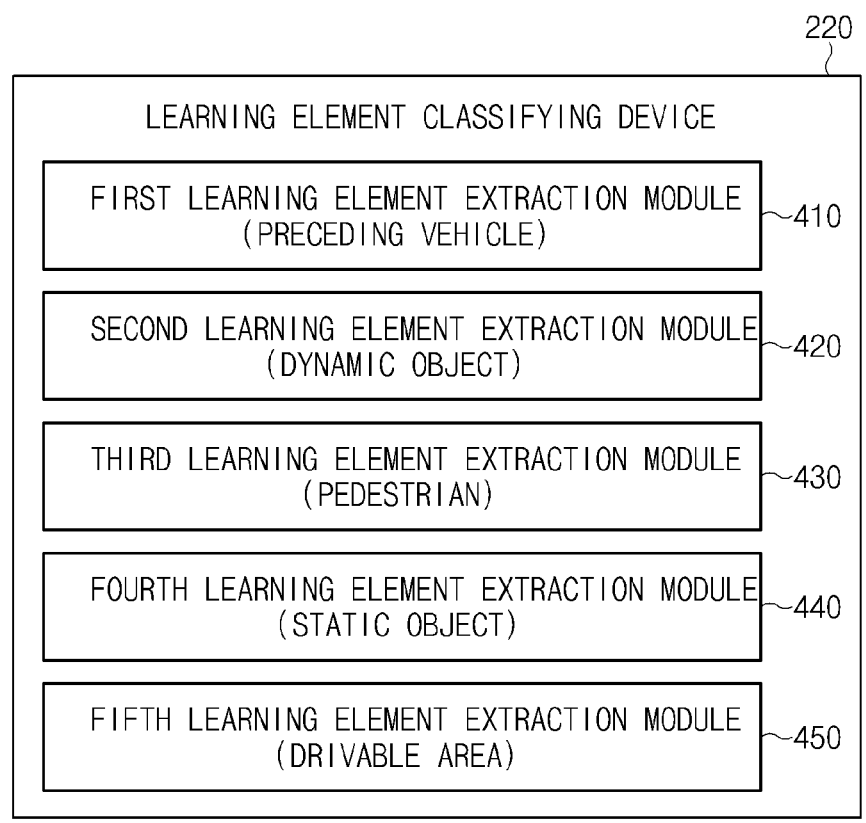
FIG. 4 is a block diagram illustrating a structure of a learning element classifying device according to an embodiment of the present disclosure.

FIG. 4 is a block diagram illustrating a structure of a learning element classifying device according to an embodiment of the present disclosure.

Referring to FIG. 4, a learning element classifying device 220 may be configured to include first to fifth learning element extraction modules 410 to 450.

The first learning element extraction module 410 may extract learning element data associated with determining an intention of a preceding vehicle.

The second learning element extraction module 420 may extract learning element data associated with determining a risk of a vehicle, that is, a dynamic object, which is traveling on a lane opposite to the lane where a host vehicle is traveling.

The third learning element extraction module 430 may extract learning element data associated with a pedestrian around the host vehicle.

The fourth learning element extraction module 440 may extract learning element data associated with determining a risk of a static object around the lane where the host vehicle is traveling.

The fifth learning element extraction module 450 may extract learning element data associated with determining a drivable area of the host vehicle.

Figure 5:
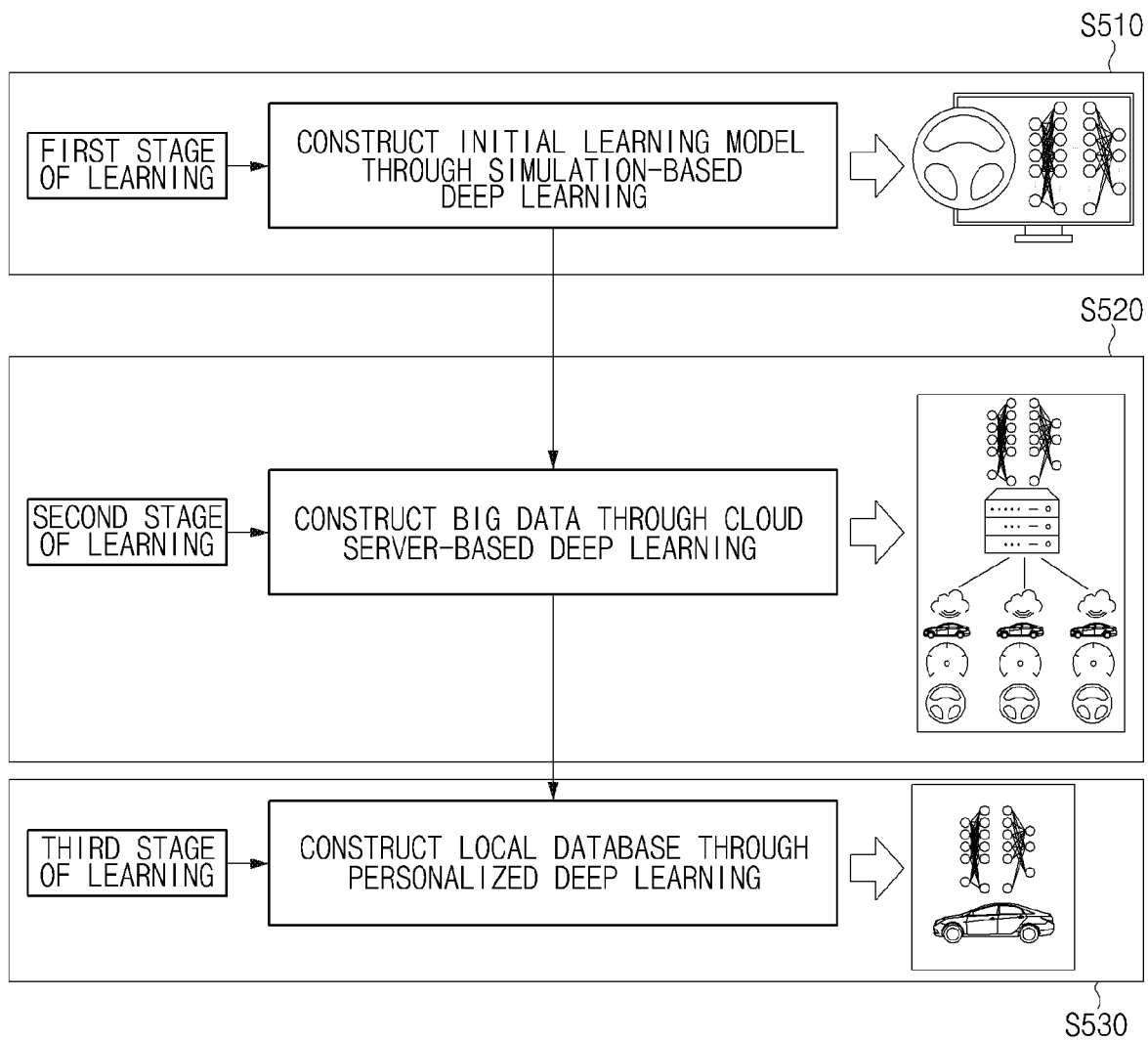
FIG. 5 is a drawing illustrating a method for obtaining training data through learning for each stage according to an embodiment of the present disclosure.

FIG. 5 is a drawing illustrating a method for obtaining training data through learning for each stage according to an embodiment of the present disclosure.

Referring to FIG. 5, a system for generating a U-turn path in a deep learning-based autonomous vehicle may obtain training data necessary to determine an optima path in first to third learning stages.

As an example, the training data may be obtained through the first to third learning stages.

In S510, an apparatus 200 of FIG. 2 may construct an initial learning model through simulation-based deep learning in the first learning stage.

The first learning stage is easy to obtain training data and is capable of learning various scenarios, but a plurality of situations which are not identical to the reality occur in the first learning stage.

In S520, the apparatus 200 may construct big data through cloud server-based deep learning in the second learning stage. In other words, the apparatus 200 may use big data necessary to determine an optimal U-turn path through deep learning based on recognition/determination information of autonomous vehicles, which is collected by a central server.

The second learning stage is capable of easily obtaining training data as autonomous vehicles are mass-produced and distributed, but it is difficult to provide a personalized path service, for example, a path service in which a personal U-turn tendency is reflected in the second learning stage.

In S530, the apparatus 200 may construct a local database through personalized deep learning in the third learning stage.

The third learning stage is capable of diversifying a U-turn mode of the autonomous vehicle through learning suitable for a personal U-turn tendency. However, data collection necessary for learning is slow in the third learning stage.

As described above, because training data necessary for learning is insufficient at the beginning of the service of the autonomous vehicle, an initial data model may be constructed through simulation-based deep learning. In the middle of the service of the autonomous vehicle, a data model, that is, big data suitable for a real driving situation may be constructed by using sensor information, collected from a plurality of autonomous vehicles, for learning using a data logger provided in a central server. In the end of the service of the autonomous vehicle, feedback information may be input to reflect a personal U-turn tendency in the learned deep learning model.

Figure 6:
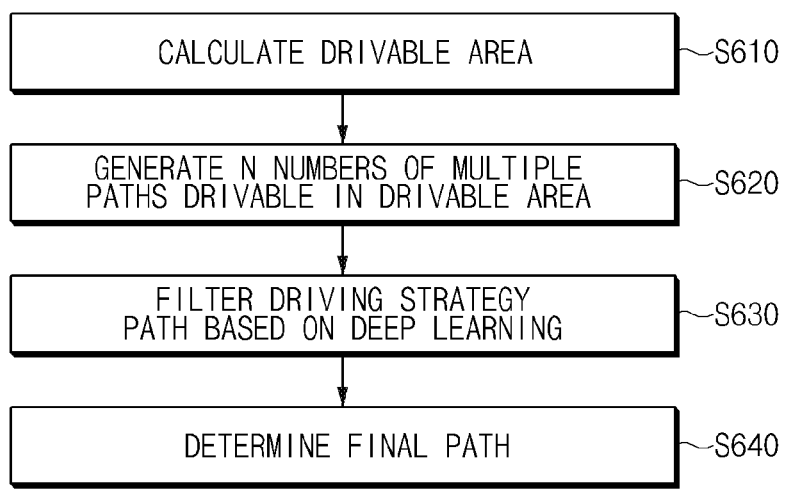
FIG. 6 is a flowchart illustrating a method for generating a U-turn path in a deep learning-based autonomous vehicle according to an embodiment of the present disclosure.

FIG. 6 is a flowchart illustrating a method for generating a U-turn path in a deep learning-based autonomous vehicle according to an embodiment of the present disclosure.

Referring to FIG. 6, in S610, an apparatus 200 of FIG. 2 may calculate a drivable area based on locations of static/dynamic objects, dynamic information, location information of a surrounding structure, and the like.

In S620, the apparatus 200 may generate N numbers of drivable multiple paths by a path generation algorithm. As an example, the path generation algorithm may include, but is not limited to, a path generation algorithm based on a random probability and a path generation algorithm based on a uniform offset in a drivable area.

In S630, the apparatus 200 may perform an operation of filtering a driving strategy based on deep learning.

Herein, the operation of filtering the driving strategy path may include classifying various input information collected from a peripheral device in a deep learning classification technique, selecting a most suitable U-turn strategy through neural network learning based on the classified input information, and excluding a path, which is matched to the selected U-turn strategy, from candidate paths.

In S640, the apparatus 200 may calculate an evaluation score for each corresponding path based on a risk, curvature, and length of each of paths filtered by reflecting the U-turn strategy.

Figure 7:
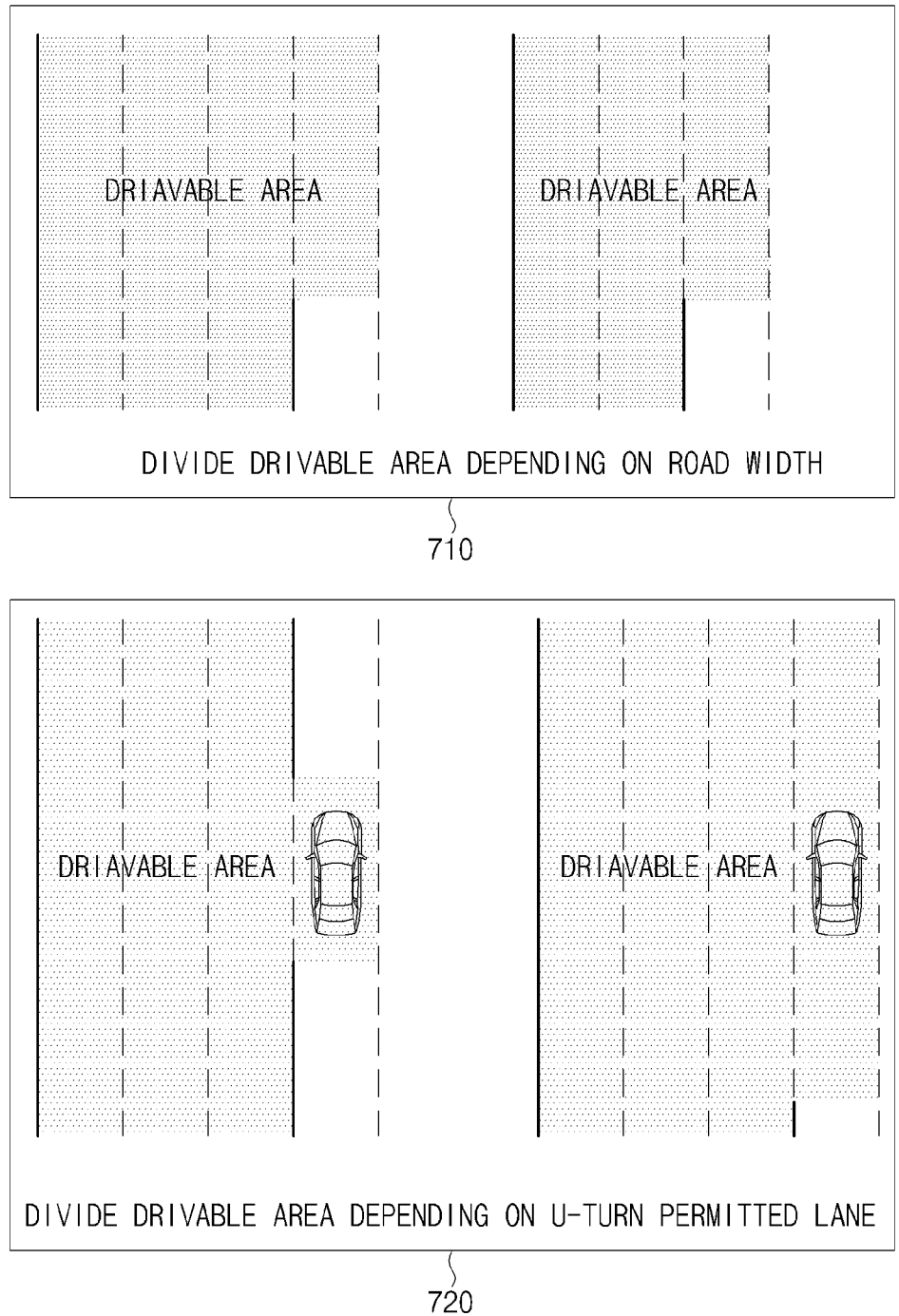
FIG. 7 is a drawing illustrating a procedure of calculating a drivable area according to an embodiment of the present disclosure.

FIG. 7 is a drawing illustrating a procedure of calculating a drivable area according to an embodiment of the present disclosure.

In detail, FIG. 7 is a drawing illustrating a procedure of calculating a drivable area according to a road structure.

When it is impossible for an autonomous vehicle to make a U-turn once because the road is narrow in U-turn permitted area, the autonomous vehicle may attempt a U-turn strategy including reverse or various U-turn strategies of determining a state of a surrounding vehicle and making a big turn to attempt a U-turn. However, before various U-turn strategies are attempted, it is necessary to accurately determine a road structure of a driving area.

As an example, it is easy to determine a behavior of a preceding vehicle by dividing a lane where it is possible to make a left turn and make a U-turn and a lane where it is possible to make a U-turn only.

In an embodiment, information about a lane where it is possible to make a U-turn may be identified by two methods below.
1. A method for identifying a U-turn marking on the lane by use of a camera; or
2. A method for determining whether a current location recognition state is good and whether attributes of a lane marking on the lane of a host vehicle on a detailed map is a U-turn.

In an embodiment, two methods below may be used to identify line information
1. A method for determining whether the line is a dotted line by use of a camera; or
2. A method for determining whether a current location recognition state is good and whether attributes of a line of a lane next to a host vehicle on a detailed map is a dotted line.

Because a drivable area according to a road structure is identical to a real drivable area as a location recognition state of an autonomous vehicle is better, a location recognition state flag (good/average/poor) may be an important learning element to calculate a drivable area.

The drivable area may be a union area of all areas where it is possible for the host vehicle to arrive upon driving in the road without violating regulations, which may be output as a point set of an outer line on a two-dimensional (2D) plane.

Thus, an area calculating device 130 of FIG. 1 may output a lane marking, line information, a location of a detailed map of the host vehicle, a location recognition state, information about an outer line along the road, and a drivable area calculated based on them.

Reference numeral 710 shows an example of dividing a drivable area depending on a road width, and reference numeral 720 shows an example of dividing a drivable area depending on a U-turn permitted line.

Figure 8:
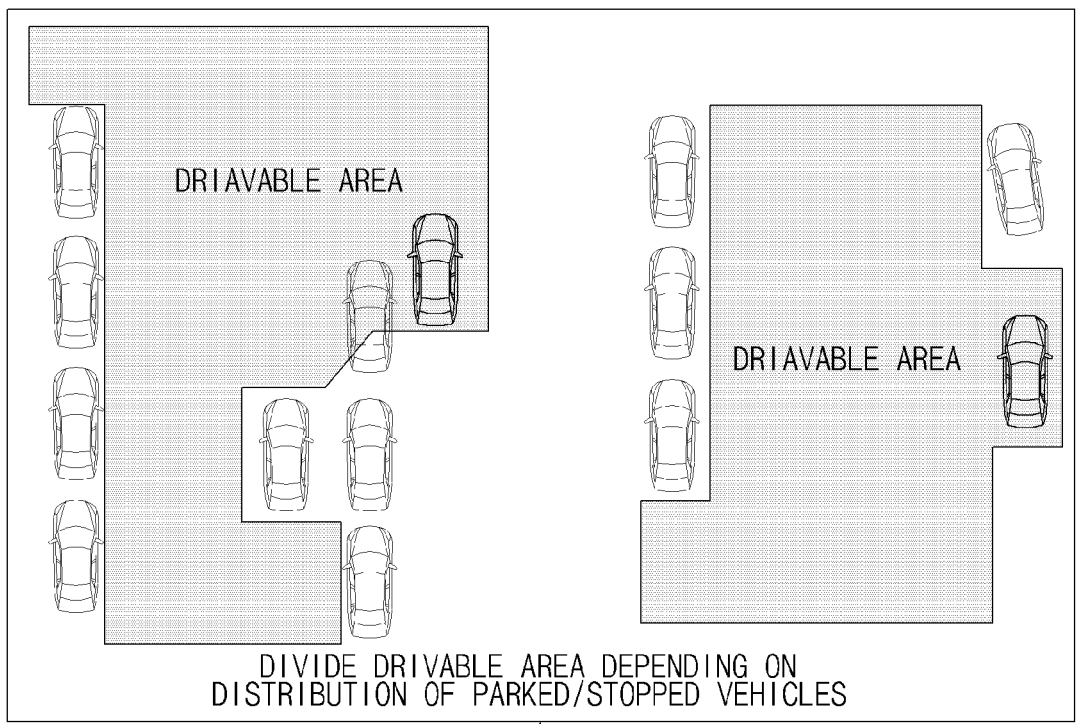
FIG. 8 is a drawing illustrating a procedure of calculating a drivable area according to another embodiment of the present disclosure.
Figure 8:
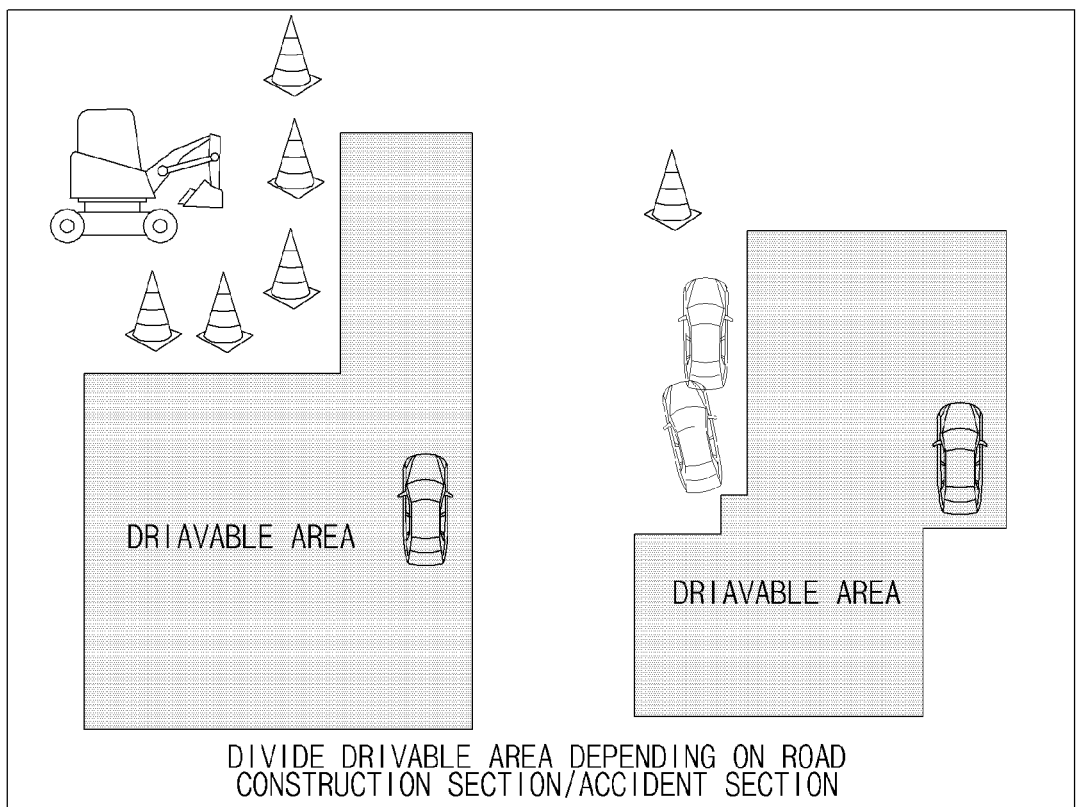

FIG. 8 is a drawing illustrating a procedure of calculating a drivable area according to another embodiment of the present disclosure.

In detail, FIG. 8 is a drawing illustrating a procedure of calculating a drivable area depending on a static object.

When it is impossible for an autonomous vehicle to make a U-turn once because the road is narrow in a U-turn permitted area, the autonomous vehicle may attempt a U-turn strategy including reverse or various U-turn strategies of determining a state of a surrounding vehicle and making a big turn to attempt a U-turn. However, before various U-turn strategies are attempted, it is necessary to determine an accurate location of a static object.

The static object may refer to an object which is not classified as being currently moved, and a parked/stopped vehicle, a vehicle waiting for the light, a road construction section, an accident section, or the like may be classified as a static object to be used to calculate a drivable area.

The drivable area may be a union area of all areas where it is possible for the host vehicle to arrive upon driving in the road without violating regulations. An area calculating device 130 of FIG. 1 may output a drivable area as a point set of an outer line on a 2D plane.

Thus, the area calculating device 130 may output information about locations of static objects, information about an outer line, information about an occupied lane, and a drivable area calculated based on them.

Reference numeral 810 shows an example of dividing a drivable area depending on the distribution of parked/stopped vehicles, and reference numeral 820 shows an example of dividing a drivable area depending on a road construction section and an accident section.

Figure 9:
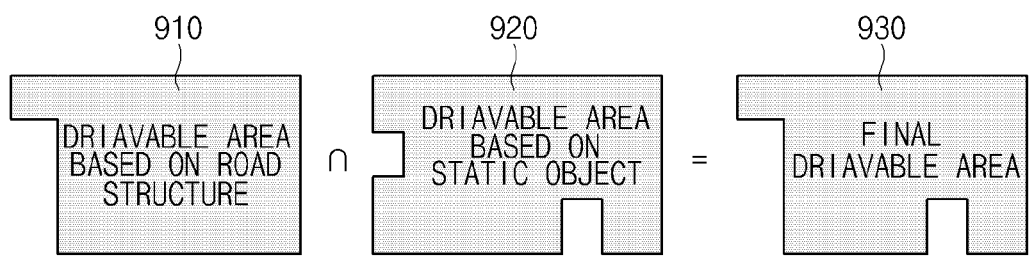
FIG. 9 is a drawing illustrating a procedure of calculating a final drivable area according to an embodiment of the present disclosure.

FIG. 9 is a drawing illustrating a procedure of calculating a final drivable area according to an embodiment of the present disclosure.

Referring to FIG. 9, a final drivable area 930 may be calculated by an area, that is, an intersection where a drivable area 910 based on a road structure and a drivable area 920 based on a static object are overlapped.

The drivable area should be calculated to suit a rear surrounding area well by reflecting a movement state of a host vehicle at an initial location to be updated.

An area calculating device 130 of FIG. 1 according to an embodiment may calculate a drivable area based on a static object except for a dynamic object.

Because there is a high probability that a dynamic object will continue moving, the dynamic object may be used to determine a risk of an opposite lane without considering calculating a drivable area.

Figure 10:
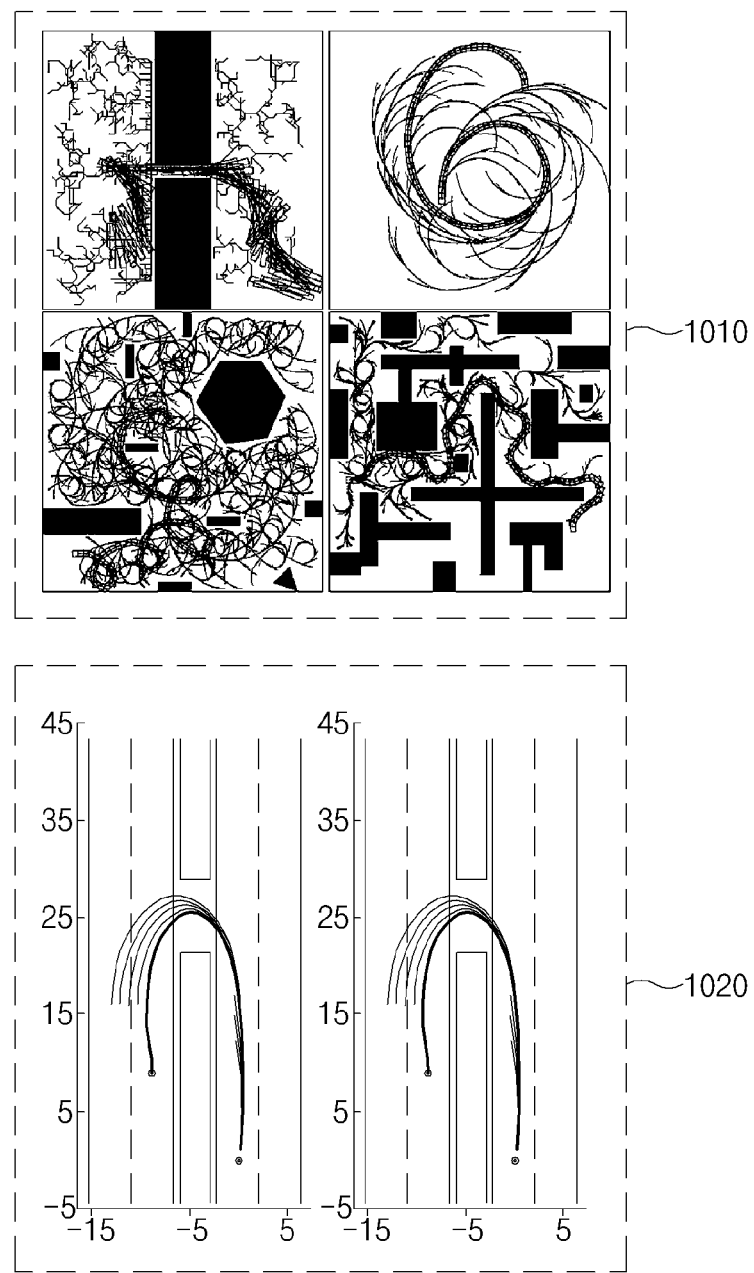
FIG. 10 is a drawing illustrating a procedure of generating multiple paths according to an embodiment of the present disclosure.

FIG. 10 is a drawing illustrating a procedure of generating multiple paths according to an embodiment of the present disclosure.

When a drivable area is derived by an area calculating device 130 of FIG. 1, a path generator 140 of FIG. 1 according to an embodiment may generate multiple paths where it is possible to make a U-turn in the entire drivable area Preferably, the path generator 140 may calculate and output all possible driving trajectories where it is possible to make a U-turn in the drivable area.

In general, a load is very small in generating a driving path in itself, but a calculation load is large to verify situation suitability of corresponding paths.

Thus, because it is actually impossible to calculate all possible driving trajectories, a load may be reduced by generating any paths through small calculation and filtering a path which is not suitable based on a strategy matched when analyzing the paths later based on deep learning.

In an embodiment, a scheme, such as a random probability-based RRT shown in reference numeral 1010 or an fRRT shown in reference numeral 1020, may be used to generate any paths as many as possible.

The smaller the interval between the generated paths, the more the paths may be generated. However, the amount of calculation performed to verify a final path may be increased. Thus, a path interval generated in proportion to calculation performance of a given system may be tuned.

Other than the scheme, multiple paths may be generated in a simple calculation scheme of uniformly generating paths per certain offset on the basis of a leftmost path and a rightmost path on which it is possible for a vehicle to drive in a drivable area.

Figure 11:
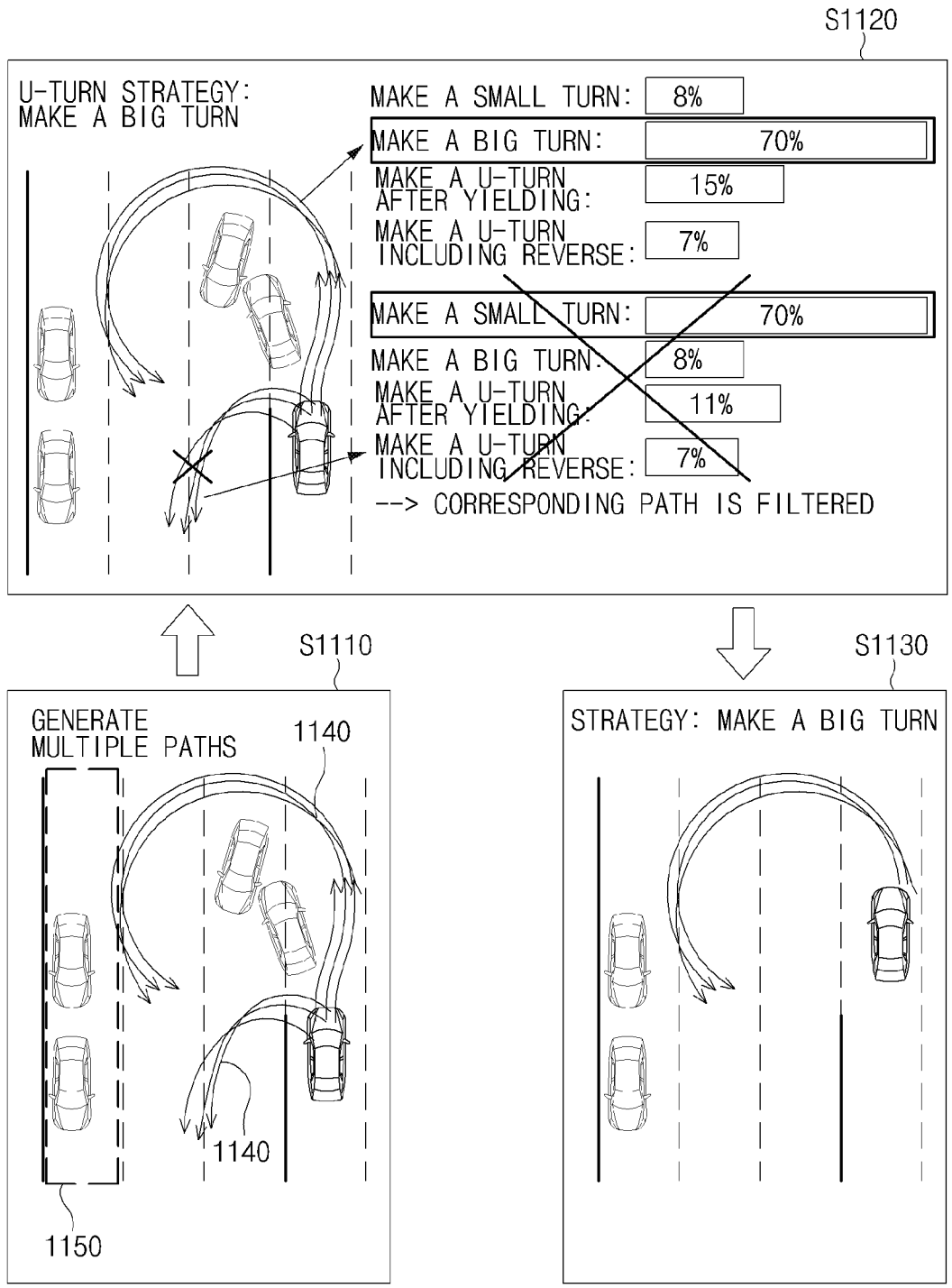
FIG. 11 is a drawing illustrating a procedure of filtering a driving power path based on deep learning according to an embodiment of the present disclosure.

FIG. 11 is a drawing illustrating a procedure of filtering a driving strategy path based on deep learning according to an embodiment of the present disclosure.

When multiple paths drivable in a drivable area are generated by a path generator 140 of FIG. 1 in S1110, in S1120, a learning device 150 of FIG. 1 may calculate a similarity probability that each path will be closest to any U-turn strategy, based on object information, road information, a predetermined U-turn strategy, and the like.

In 51130, a strategy determining device 240 of FIG. 2 may determine a final U-turn strategy based on the similarity probability calculated for each strategy.

The strategy determining device 240 including a deep learning-based driving strategy path filter may basically operate in a deep learning classification principle, which may compare the result of classifying a driving strategy path based on a surrounding object, road information, and the like with a plurality of U-turn strategies obtained from a strategy generator 110 of FIG. 1 to exclude a path, which is not identical to the U-turn strategy, from path candidates.

As an example, when a U-turn strategy classified in response to a corresponding path differs from a U-turn strategy input from the strategy generator 110, the strategy determining device 240 may exclude the corresponding path from a candidate path list.

In other words, when various possible paths are generated by the path generator 140, the strategy determining device 240 may filter paths matched to the U-turn strategy input from the strategy generator 110 among these paths.

Deep learning-based driving strategy path filtering has an advantage of effectively reducing the amount of calculation when verifying a path later and an advantage in which the path is not limited to a space because it is determined that a semantic interpretation of the path is identical to a corresponding U-turn strategy based on deep learning, rather than spatially limiting the path when selecting a path candidate.

Like reference numeral 1140, when there is an accident vehicle in front of a host vehicle, it may be necessary to generate a special path where the host vehicle makes a big turn over the host vehicle lane.

Because all of paths in reference numeral 1140 is roughly included in a rotation strategy in meaning, a U-turn path may be generated using an empty space in a taxi parking area 1150.

Thus, all possible multiple paths may be generated for a special situation with which it is impossible for an expert to cope, and a strategy may be derived through deep learning interpretation of a current situation.

Furthermore, paths, which are matched to a corresponding strategy, may be filtered to be excluded from candidate paths, and an optimal path may be selected based on a risk, curvature, or length of each of paths which are not filtered.

When all of possible paths are selected without strategy determining to select a final path based on only a score, an inefficient path where the host vehicle makes a bigger turn than a path where the host vehicle passes through a vehicle to yield in front of the host vehicle may be selected.

Figure 12:
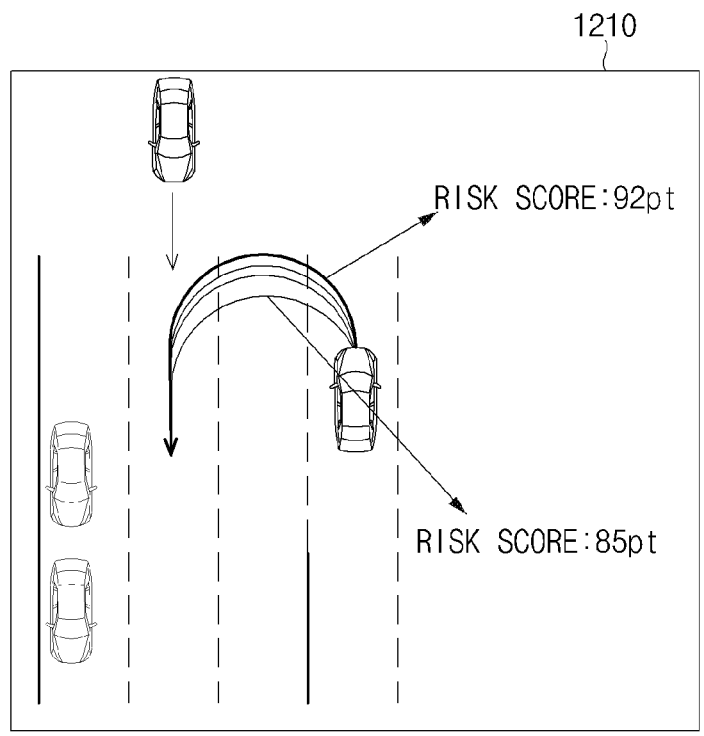
FIG. 12 is a drawing illustrating a procedure of determining a final path according to an embodiment of the present disclosure.
Figure 12:
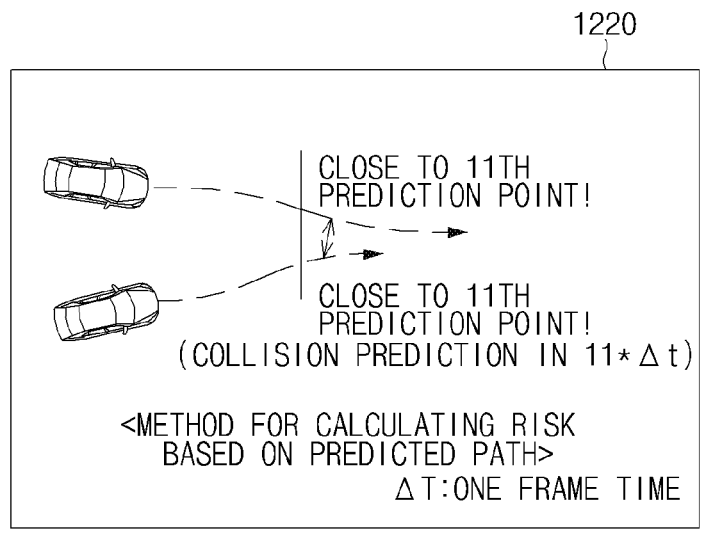

FIG. 12 is a drawing illustrating a procedure of determining a final path according to an embodiment of the present disclosure.

In detail, FIG. 12 shows a method for determining a final path based on a risk score.

As shown in reference numeral 1210, an optimal path determining device 260 of FIG. 2 according to an embodiment may calculate risk scores for multiple paths in which the U-turn is reflected to determine a final path.

The multiple paths in which the U-turn is reflected may be paths which are present in a drivable area and are matched to a predetermined U-turn strategy.

However, it is necessary to divide a priority path and a non-priority path when dynamic/static objects are distributed around a lane where the host vehicle is traveling.

As shown in reference numeral 1220, as prediction points over time for a host vehicle lane are compared with prediction points over time for an outside vehicle lane, a driver of the host vehicle may fear to collide when an interval between two points is less than or equal to a specific criterion in the same time.

Thus, the risk score may be set to be lower as a time when a prediction point is close within a specific distance is shorter.

Furthermore, when a TTC is lower than a specific criterion based on a longitudinal/lateral TTC, a passenger of the host vehicle may fear to collide.

Thus, the risk score may be set to be lowered in proportion to the number of times that the longitudinal/lateral TTC decreases to the specific criterion or less.

Figure 13:
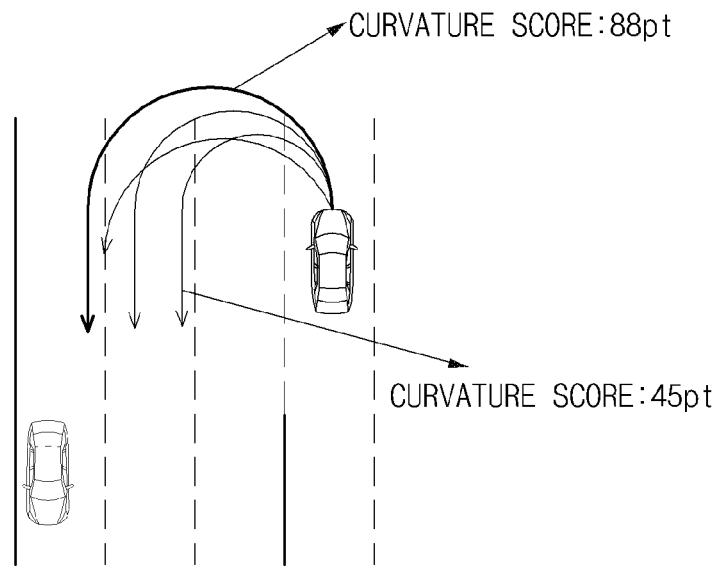
FIG. 13 is a drawing illustrating a procedure of determining a final path according to another embodiment of the present disclosure.
Figure 13:
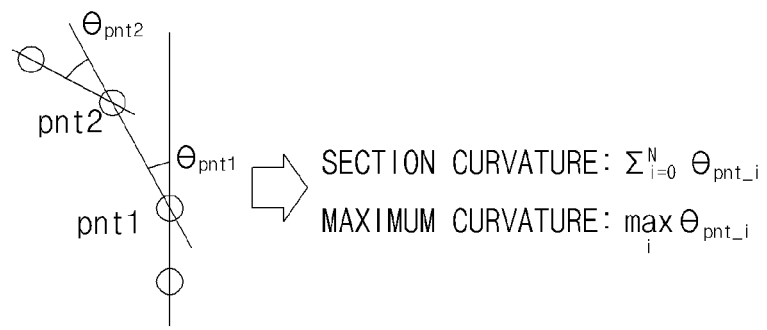

FIG. 13 is a drawing illustrating a procedure of determining a final path according to another embodiment of the present disclosure.

In detail, FIG. 13 shows a method for determining a final path based on a curvature score.

As shown in FIG. 13, an optimal path determining device 260 of FIG. 2 according to an embodiment may calculate curvature scores for multiple paths in which the U-turn is reflected to determine a final path.

The multiple paths in which the U-turn is reflected may be paths which are present in a drivable area and are matched to a predetermined U-turn strategy.

However, the larger the curvature of a corresponding path, the larger the centripetal force. The passenger feels to decrease riding quality. This may cause non-preference of the path.

Thus, the larger the section curvature of each of paths and the maximum curvature of a specific point, the less the riding quality may be decreased.

The optimal path determining device 260 according to an embodiment may calculate a curvature score in inverse proportion to the section curvature and the maximum curvature.

A curvature of the path may be in proportion to the sum of acute angles of segments between points forming the path, and the entire section curvature and the maximum curvature may be calculated using the curvature of the path.

Figure 14:
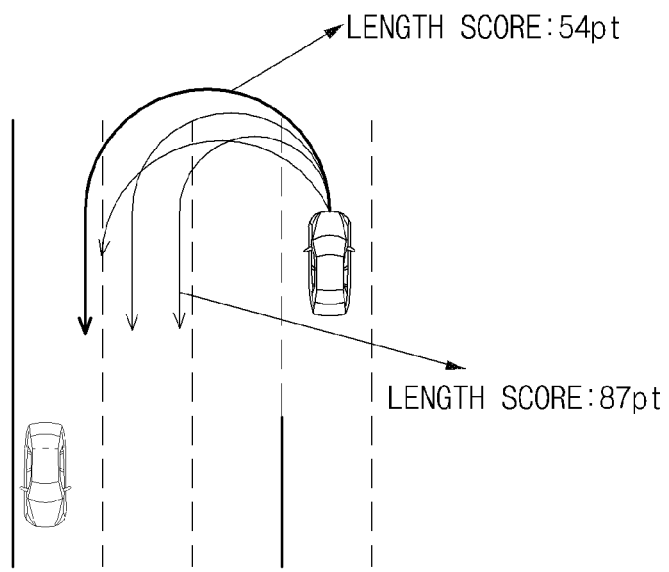
FIG. 14 is a drawing illustrating a procedure of determining a final path according to another embodiment of the present disclosure.
Figure 14:
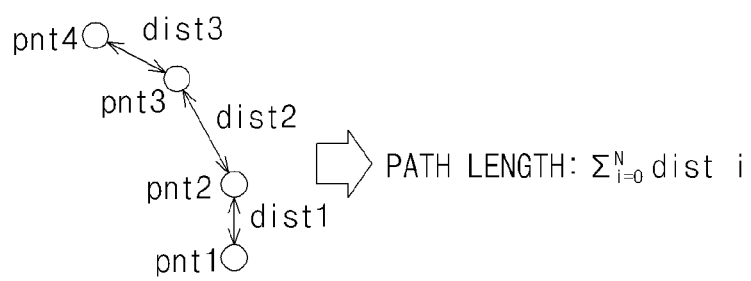

FIG. 14 is a drawing illustrating a procedure of determining a final path according to another embodiment of the present disclosure.

In detail, FIG. 14 shows a method for determining a final path based on a path length.

As shown in FIG. 14, an optimal path determining device 260 of FIG. 2 according to an embodiment may calculate path lengths for multiple paths in which the U-turn is reflected to determine a final path.

However, the longer the driving length for a U-turn of a specific path, the more the time taken to make a U-turn may be increased. The longer the time taken to make a U-turn, the weaker it may be with a change in a surrounding situation.

Thus, as the length of the entire path is longer, the optimal path determining device 260 may set a length score in inverse proportion to the length of the entire path.

The optimal path determining device 260 according to another embodiment of the present disclosure may calculate two of a risk score, a curvature score, and a length score of each candidate path. The optimal path determining device 260 may determine a final path based on the at least two calculated scores. In this case, different weights may be assigned to risk, curvature, and length.

Figure 15:
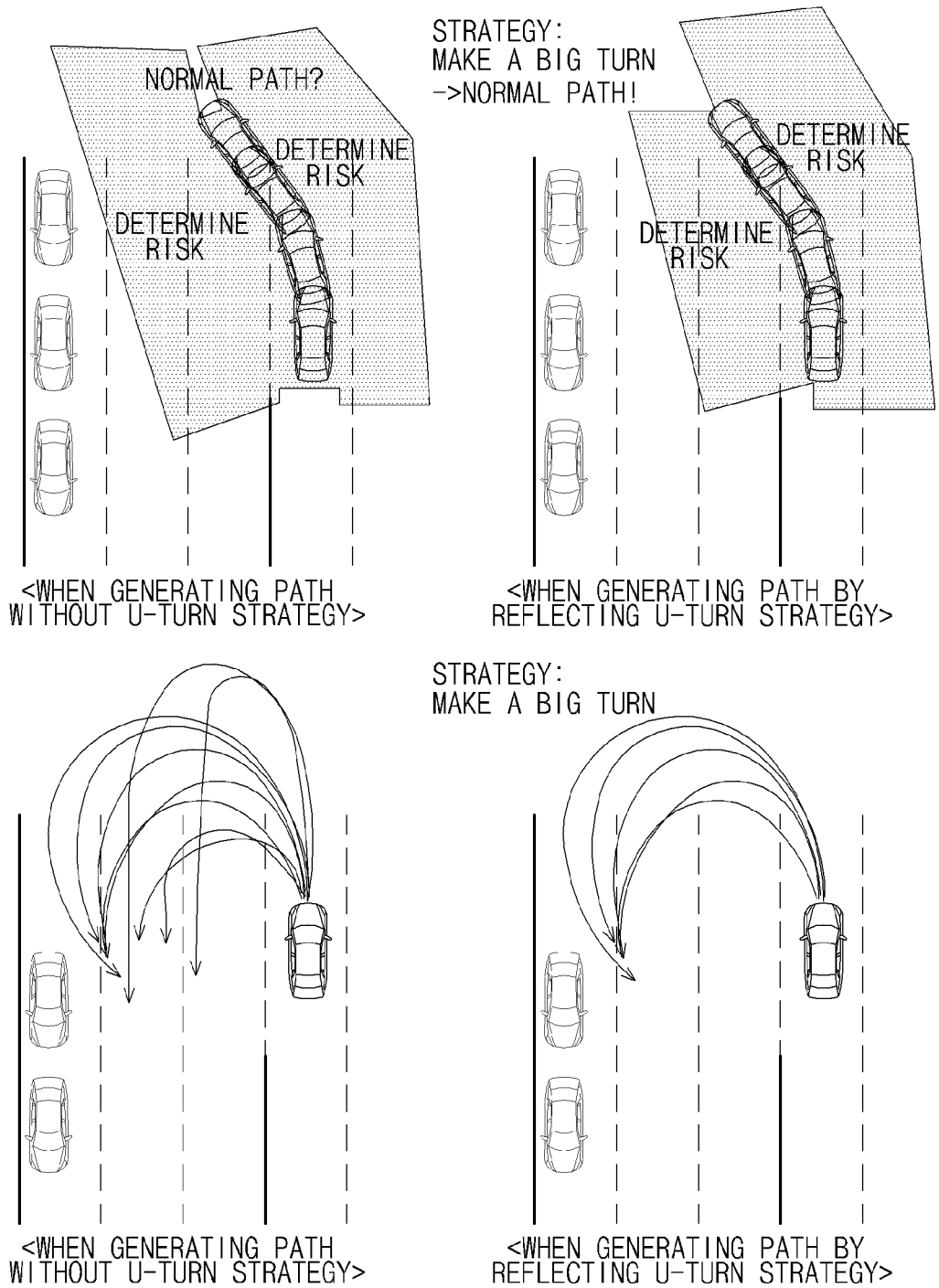
FIG. 15 is a drawing illustrating comparison of path generation according to whether a U-turn power is reflected according to an embodiment of the present disclosure.

FIG. 15 is a drawing illustrating comparison of path generation according to whether a U-turn strategy is reflected according to an embodiment of the present disclosure.

Referring to FIG. 15, when a path is selected based on deep learning in the entire drivable area in which a U-turn strategy is not reflected, a host vehicle may travel along an unexpected, unintended path.

In this case, when a strategy is not identified, it may fail to determine whether the path on which the host vehicle is currently traveling is a normal path or an abnormal path.

Furthermore, because of having another determination criterion depending on a driving strategy when risk is determined, it is necessary to determine the driving strategy before a path is generated.

In general, because the load for verifying whether the generated path is suitable for a surrounding situation is very larger than the load for generating the path itself, when the path is not filtered by a driving strategy when the path is selected, all possible paths should be considered as candidates. Thus, the amount of calculation may increase geometrically when the path is verified.

Because the filtering by the driving strategy does not necessarily spatially limit candidates of paths and is performed on the basis of the most similar driving strategy through deep learning interpretation (classification) of possible paths, filtering by the meaning of a path rather than a space may be performed.

Figure 16:
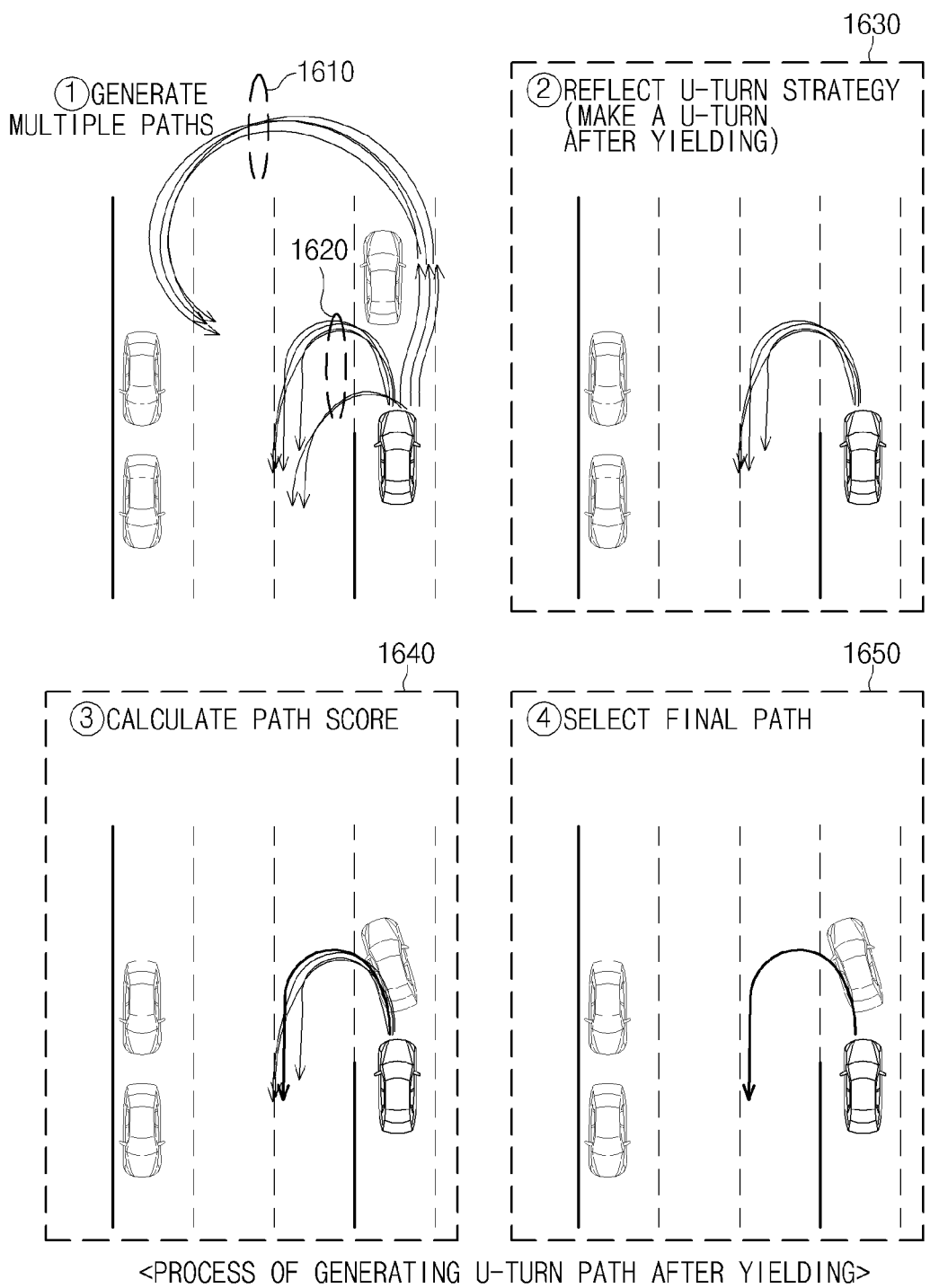
FIG. 16 is a drawing illustrating a method for generating a path when there is a vehicle to yield according to an embodiment of the present disclosure.

FIG. 16 is a drawing illustrating a method for generating a path when there is a vehicle to yield according to an embodiment of the present disclosure.

Upon the generation of a U-turn path, when all of possible paths are selected without strategy determination to select a final path based on only a score, an inefficient path 1610 where a host vehicle makes a bigger turn than a path 1620 where the host vehicle passes through a vehicle to yield in front of the host vehicle may be selected.

As shown in reference numeral 1630, paths, which are identical to a corresponding strategy among multiple paths initially generated, may be left based on a U-turn strategy derived through deep learning interpretation of a surrounding situation, and the other multiple paths may be excluded.

In an embodiment of the present disclosure, filtering by a U-turn strategy does not necessarily limit candidate paths with regard to only a spatial situation.

In other words, in an embodiment of the present disclosure, because filtering is performed based on a predetermined U-turn strategy through deep learning interpretation of possible paths, filtering by semantic interpretation rather than spatial interpretation may be performed.

Furthermore, as shown in reference numeral 1640, a score for each candidate path may be calculated based on risk, curvature, or length in candidate paths in which a U-turn strategy is reflected. Thereafter, as shown in reference numeral 1650, an optimal drivable path may be selected through comparison of the calculated scores between the candidate paths.

The operations of the method or the algorithm described in connection with the embodiments disclosed herein may be embodied directly in hardware or a software module executed by the processor or in a combination thereof. The software module may reside on a storage medium and/or the storage such as a RAM, a flash memory, a ROM, an EPROM, a EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

An embodiment of the present disclosure may provide a method and apparatus for generating a U-turn path of an autonomous vehicle based on deep learning.

An embodiment of the present disclosure may provide a method and apparatus for generating a U-turn path in a deep learning-based autonomous vehicle may classify and learn various sensing data for each feature, may generate strategic multiple paths, and may generate an optimal U-turn path with regard to various evaluation elements.

An embodiment of the present disclosure may provide a method and apparatus for generating a U-turn path in a deep learning-based autonomous vehicle may provide a more reliable U-turn path by constructing U-turn strategies, actually performed for each driving situation, as big data and performing deep learning based on the big data when the same or similar situation occurs.

An embodiment of the present disclosure may provide a method and apparatus for generating a U-turn path in a deep learning-based autonomous vehicle may improve spatial freedom in generating a U-turn path.

An embodiment of the present disclosure may provide an autonomous vehicle with a safer, more convenient U-turn path than making a U-turn based on real determination of the driver by constructing an adaptive U-turn strategy generated based on deep learning and an optimal U-turn path generated according to the adaptive U-turn strategy as big data.

An embodiment of the present disclosure may quickly obtain various training data through learning for each stage.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for generating a U-turn path in an autonomous vehicle, the method comprising:
    calculating, by an area calculating device, a drivable area;
    generating, by a path generator, multiple paths drivable in the drivable area;
    filtering, by a learning device, a driving strategy path among the multiple paths based on deep learning; and
    determining, by a controller, a final path from the filtered candidate paths, wherein determining the final path includes:
        calculating an evaluation score for each candidate path for risk, curvature, and distance; and
        determining the final path based on the evaluation score calculated for each candidate path; and wherein the final path determined according to a situation where a host vehicle is traveling is recorded is a database and is used in the deep learning.

2. The method of claim 1, wherein the drivable area is calculated based on at least one of information about an object around a host vehicle, information about a road around the host vehicle, or information about a structure around the host vehicle.

3. The method of claim 2, wherein filtering the driving strategy path includes:
classifying input information collected from a plurality of peripheral devices in a deep learning classification technique;
selecting a most suitable U-turn strategy through neural network learning based on the classified input information; and
excluding a path, which is not matched to the selected U-turn strategy, from the candidate paths.

4. The method of claim 3, wherein selecting the most suitable U-turn strategy through the neural network learning based on the classified input information includes:
obtaining a plurality of previously generated U-turn strategy lists;
calculating a similarity probability for each U-turn strategy included in the U-turn strategy list through the neural network learning for the multiple paths; and
selecting a most suitable U-turn strategy based on the similarity probability calculated for each U-turn strategy.

5. The method of claim 4, wherein the multiple paths, which are not mapped to the U-turn strategy included in the U-turn strategy list, are filtered.

6. The method of claim 5, wherein a neural network has a deep learning structure of at least one of convolution neural networks (CNN), a recurrent neural network (RNN), deep neural networks (DNN), a restricted Boltzmann machine (RBM), deep belief networks (DBN), a long short-term memory (LSTM), a gamma neural network (GAN), or a softmax model.

7. The method of claim 2, wherein the object includes a static object and a dynamic object, and
wherein the static object is used to calculate the drivable area and the dynamic object is used to analyze a risk of an outside vehicle approaching from a lane opposite to a lane on which the host is traveling.

8. The method of claim 7, wherein calculating the drivable area includes:
calculating a first drivable area based on the road information;
calculating a second drivable area based on the static object; and
determining an area, where the first drivable area and the second drivable area are overlapped, as a final drivable area.

9. The method of claim 1, further comprising:
constructing a training model for the deep learning,
wherein the training model is constructed by:
constructing an initial learning model through simulation-based deep learning;
constructing big data through cloud server-based deep learning; and
constructing a local database through personalized deep learning.

10. An apparatus for generating a U-turn path in an autonomous vehicle, the apparatus comprising:
a fusion device configured to generate fusion information;
an area calculating device configured to calculate a drivable area based on the fusion information;
a path generator configured to generate multiple paths drivable in the drivable area;
a learning device configured to filter a driving strategy path among the multiple paths based on deep learning; and
a controller configured to determine a final path from the filtered candidate paths;
wherein the controller calculate an evaluation score for each candidate path for risk, curvature, and distance and determines the final path based on the evaluation score calculated for each candidate path; and
wherein the final path determined according to a situation where a host vehicle is traveling is recorded in a database and is used in the deep learning.

11. The apparatus of claim 10, wherein the fusion device includes:
an object fusion module configured to generate object information around a host vehicle;
a road information fusion module configured to generate road information around the host vehicle; and
a location information fusion module configured to generate global coordinate information necessary to generate the road information.

12. The apparatus of claim 11, wherein the learning device classifies input information collected from a plurality of peripheral devices in a deep learning classification technique, selects a most suitable U-turn strategy through neural network learning based on the classified input information, and excludes a path, which is not matched to the selected U-turn strategy, from the candidate paths.

13. The apparatus of claim 12, further comprising:
a strategy generator configured to generate a plurality of U-turn strategy lists,
wherein the learning device obtains the plurality of previously generated U-turn strategy lists from the strategy generator, calculates a similarity probability for each U-turn strategy included in the U-turn strategy list through the neural network learning for the multiple paths, and selects a most suitable U-turn strategy based on the similarity probability calculated for each U-turn strategy.

14. The apparatus of claim 13, wherein the multiple paths, which are not mapped to the U-turn strategy included in the U-turn strategy list, are filtered.

15. The apparatus of claim 14, wherein a neural network has a deep learning structure of at least one of convolution neural networks (CNN), a recurrent neural network (RNN), deep neural networks (DNN), a restricted Boltzmann machine (RBM), deep belief networks (DBN), a long short-term memory (LSTM), a gamma neural network (GAN), or a softmax model.

16. The apparatus of claim 11, wherein the object information includes static object information and dynamic object information, and
wherein the static object information is used to calculate the drivable area and the dynamic object information is used to analyze a risk of an outside vehicle approaching from a lane opposite to a lane on which the host is traveling.

17. The apparatus of claim 16, wherein the area calculating device calculates a first drivable area based on the road information, calculates a second drivable area based on the static object, and determines an area, where the first drivable area and the second drivable area are overlapped, as a final drivable area.

18. The apparatus of claim 10, wherein a training model is used for the deep learning, and
wherein the training model is generated by:
an algorithm for constructing an initial learning model through simulation-based deep learning;
an algorithm for constructing big data through cloud server-based deep learning; and
an algorithm for constructing a local database through personalized deep learning.

\* \* \* \* \*